Aug. 22, 1939.  H. J. MURRAY  2,170,460
VARIABLE-SPEED POWER TRANSMISSION WITH UNIDIRECTIONAL CLUTCH
Filed March 3, 1936  4 Sheets-Sheet 4
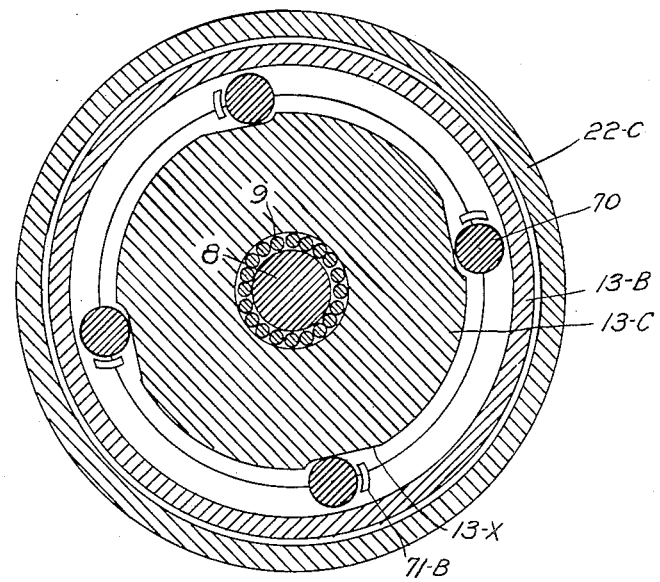
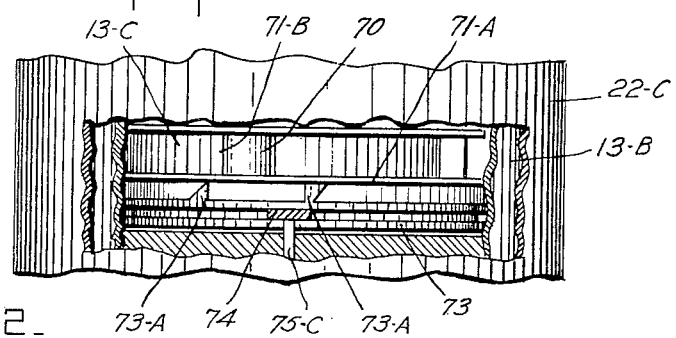
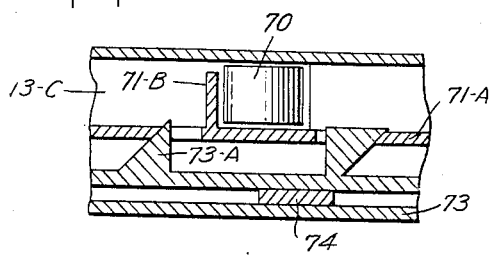
INVENTOR
Howard J. Murray.

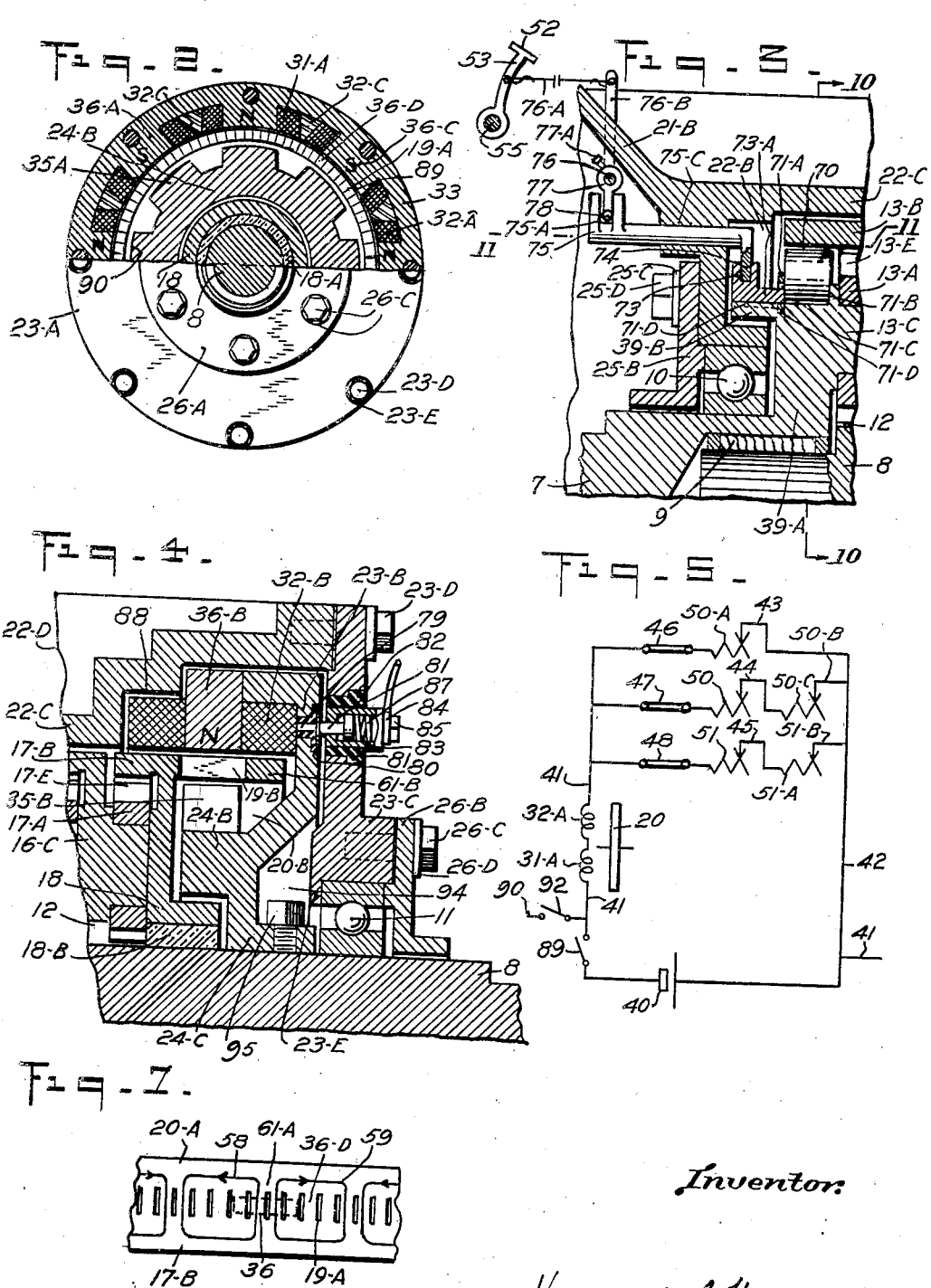

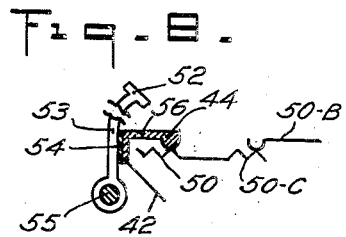
Fig. 8.
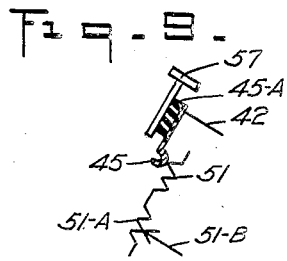
Fig. 9.
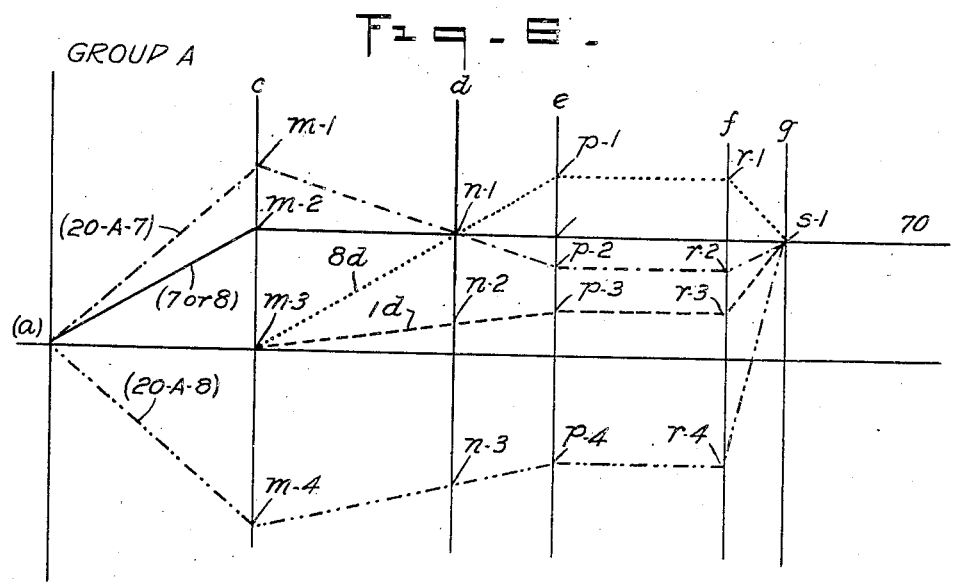
Fig. 6.
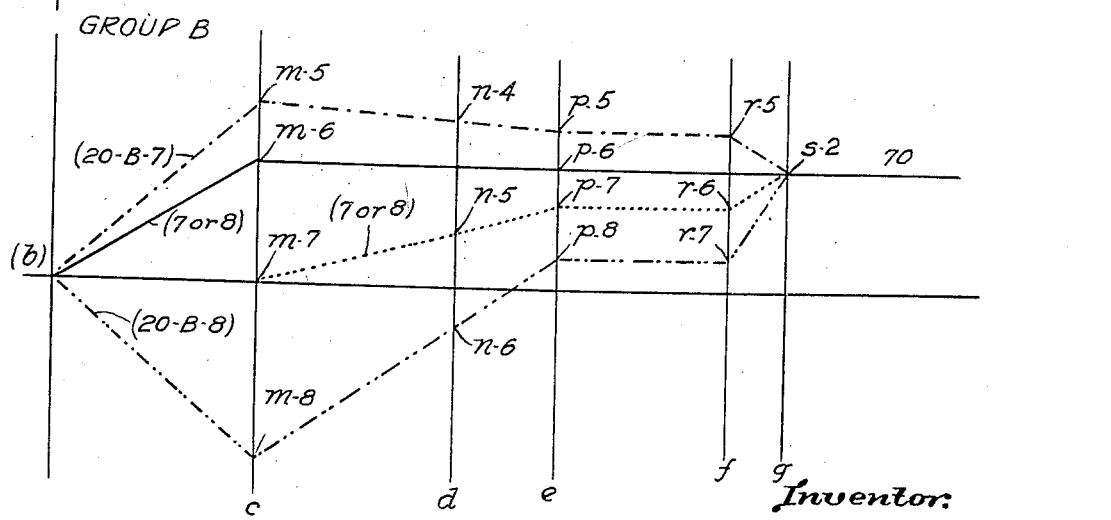

Patented Aug. 22, 1939

2,170,460

UNITED STATES PATENT OFFICE 2,170,460

VARIABLE-SPEED POWER TRANSMISSION WITH UNIDIRECTIONAL CLUTCH

Howard J. Murray, New York, N. Y.

Application March 3, 1936, Serial No. 66,876

20 Claims. (Cl. 172—239)

My invention relates in general to a power transmission and specifically relates to a device for automatically effecting slip-drive and positive drive relations between driving and driven members of a power transmission mechanism.

One of the objects of the present invention is to provide a simple form of power transmission mechanism to use a comparatively small percentage of the total power transmitted by the driving member to automatically control slip-drive relations of the driving and driven members of the said transmission mechanism.

A further object of the present invention is to provide an automatic change speed mechanism arranged to be automatically controlled in its operation by the speed of the driving member and the load resistance of the driven member.

An additional object of the present invention is to effect by the use of a comparatively small dynamo-electric couple the transmission of power from a driving member to a driven member under such conditions that the speed of the driven member may be semi-automatically varied to assume a proper speed drive relation with the driving member.

A still further object of the present invention is to provide a change speed mechanism arranged to be semi-automatically operated as a co-incidental function of the normal operation of a vehicle.

A still additional object of the present invention includes the use of a unidirectional clutch to become automatically operative as the normally driven member becomes the driving member.

The present disclosure contemplates the providing of means including a dynamo-electric couple arranged to affect driving elements of a differential gear organization including a plurality of secondary differential acts so that its action may be in effect mechanically multiplied to control the individual driving action of each of the sets to collectively cause the transmission of power from the driving member to the driven member.

The present invention is a development of the disclosure included in my U. S. Patent application Serial No. 23,040 filed May 23, 1935 and entitled "Automatic electric variable speed bidirectional and free-wheeling transmission".

In application No. 23,040 there is disclosed a combination of means including a stationary field producing element and an associated rotatable armature for receiving a small portion of the total power delivered by the driving member to thereby control all of the power transmitted from the driving member to the driven member.

It was found in actual operation of the device of the No. 23,040 application disclosure that the speed driving relations of the driving and driven members were not the same under bidirectional driving conditions. While it is possible according to the disclosure of application No. 23,040 to obtain universal speed driving relations with the normally driving member as the driving member, it is not possible to obtain these universal speed drive relations when the normally driven member becomes the driving member.

This bidirectional unbalanced driving condition is obtained in the device as disclosed in application No. 23,040 because of the different conditions created when the normally driving member is driving as compared to the conditions created when the driving the action is obtained from the normally driven member.

Specifically applied to the combination shown by Figure 1 of the drawings of application Serial Number 23,040, it will be noted that when the normally driving member is driving, the associated rotor 20 of Fig. 1 of application Serial No. 23,040 is driven in the same relative direction at a higher speed and universal speed driving relations may be effected by a single progressive retardation of the said rotor by the stationary field. When the normally driven member becomes the driving member the associated rotor is rotated in a relatively opposite direction and the stationary field is not capable of retarding the rotor to a state of rest to even approximately effect universal speed drive relations.

While such a condition may be desirable where the operator of the vehicle desires a degree of free-wheeling when the normally driven member is driving during coasting periods, it is obvious that conditions may arise when the operator may desire to more effectively employ engine compression for braking purposes and also as a matter of safety.

Accordingly the present disclosure includes means for effecting a positive speed driving relation between the power members when the normally driven member becomes the driving member, and in addition means are provided for employing a field producing means rotatable with one of the members so as to more effectively employ engine compression when the positive speed means are not selectively employed.

In one modification of the present disclosure this positive drive relation is automatically effected by a selectively controlled unidirectional clutch of the roller type, although it is obvious that any known conventional clutch may be used without departing from the spirit of the invention. This unidirectional clutch also acts as a safety device to be automatically set in operative position when the vehicle is moved forward to tend to rotate the normally driven member faster than the normally driving member.

According to the disclosure of application No. 23,040, a dynamo-electric couple with a stationary field producing means and an associated rotatable armature is employed to receive and absorb power from the members to create torque reactions in the secondary differential sets.

The present disclosure also includes a dynamo-electric couple. In one embodiment the field producing means is attached to one of the power members for rotation therewith, and the associated armature is attached for rotation with one of the secondary differential sets. In another embodiment the field producing means is stationary and the associated armature attached for rotation with one of the secondary differential sets. In either embodiment the field means and the armature may be substituted one for the other.

Thus according to the present disclosure, rotation of the associated armature through the field flux whether stationary or rotatable results in generation of electric current with a resultant torque reaction. This torque reaction is transmitted to each of the differential sets so that a plurality of co-operatively associated torque reactions are created with the primary torque reaction created in the dynamo-electric couple.

This primary torque reaction created in the dynamo-electric couple is thus derived from the driving member power employed to move the couple inductors through the magnetic field. This reaction is found in each of the secondary differential sets. Thus a relatively small torque created in the dynamo-electric couple is amplified in effect by the resulting plurality of associated torque reactions created in the said differential sets to collectively control the transmission of a relatively great amount of power from one of the members to the other member.

Because only a small part of the total power transmitted by the driving member is transformed into electric control current in the dynamo-electric couple, it follows that the size and weight of the necessary couple parts are only a fraction of the size and weight of parts required in previously known dynamo-electric power transmission devices.

Applied to power transmission mechanisms for movable vehicles, the present disclosure device automatically and efficiently effects a proper speed driving relation between the driving and driven members, and automatically effects a positive driving relation when the normally driven member becomes the driving member.

When the present application device is provided with a stationary field producing means it may be employed to automatically effect universal speed drive relations between the driving and driven members, and in addition the strength of the produced field may be co-incidentally varied as a normal function of the operation of the vehicle to semi-automatically effect this relation with varying load resistance.

When the field producing means of the present application device is attached to one of the power members to rotate therewith, a "balanced bidirectional drive" action is obtained. But direct drive relation can only be approximately obtained with either power member driving. Universal speed relations cannot be obtained with either member driving. Positive direct drive may be obtained with a rotatable field producing means by the selective control of the unidirectional clutch means.

Thus the present disclosure provides means for effecting speed drive relations between driving and driven members of a vehicle automatically, and also as a co-incidental function of the normal operation of the vehicle. Means are also provided for affecting the automatically obtained relations to semi-automatically meet certain operating conditions.

It should be noted that the "slip" relations between the field producing means and the associated armature are greatly affected by substituting a rotatable field means for a stationary field means.

With the field rotating with the normally driving member the "slip" is decreased by an amount equal to the speed of the driving member, because the armature is rotating faster in the same direction as the driving member.

With the field means rotating with the driven member, the "slip" is decreased by an amount equal to the speed of the driven member when the normally driving member is driving.

With the field means rotating with the normally driven member as a driving member, the "slip" is increased by an amount equal to the speed of the normally driven member.

When the present device is provided with a stationary field unbalanced bidirectional speed driving relations are effected, and universal speed driving relations can only be effected as the normally driving member is driving. Underspeed driving relations can only be effected when the normally driven member is driving, and the unidirectional clutch means may be selectively released to effect positive direct drive with the driving action from the normally driven member.

When the present device is provided with a rotatable field means attached to the normally driven member, universal speed driving relations cannot be effected in either direction, but the said speed relations can more nearly approach a direct drive relation in either direction. The positive unidirectional clutch may also be employed with a rotatable field to automatically effect positive drive relations when the normally driven member becomes the driving member.

While the present invention is obviously capable of uses in any location where it is desired to receive power from a driving member at variable speed, the present invention is particularly applicable to a power transmission designed for use in connection with automobile construction, and it is in this connection that the embodiments of the present invention will be described in detail.

Various other objects and advantages of the invention will be in part obvious from an inspection of the accompanying drawings and in part will be more fully set forth in the following particular description of mechanism embodying the present invention, and the invention also consists in certain new and novel features of construction and combination of parts hereinafter set forth and claimed.

In the drawings:

Figure 1 is a physical embodiment of my invention partly in vertical section, taken axially of the main shaft; and Figure 2 is a transverse sectional view and elevation taken approximately upon the line 2—2 of Figure 1, looking in the direction indicated by the arrows; and Figure 3 is a physical embodiment of my invention in vertical section showing a modification including unidirectional clutching means, taken axially of the main shaft; and Figure 4 is a physical embodiment of my invention showing a modification including a rotating field producing means taken in vertical section and axially along the main shaft; and Figure 5 is a diagrammatic presentation of the electrical elements together with the necessary connections; and Figure 6 is a chart of curves representing the speed driving relations of the various elements; and Figure 7 is a plan view of the associated armature showing the arrangement of the inductor portions; and Figure 8 is a schematic view of one method of associating the device with the brake pedal as commonly found on automotive vehicles; and Figure 9 is a schematic view of one method of associating the dynamo-electric couple with the conventional fuel supply control as commonly found on automotive vehicles.

Figure 10 is a view in sectional elevation taken along the line 10—10 of Figure 3 in the direction indicated by the arrows.

Figure 11 is a top view taken approximately at the line 11—11 of Figure 3.

Figure 12 is an enlarged sectional view of the camming means of Figures 10 and 11.

Figure 1:
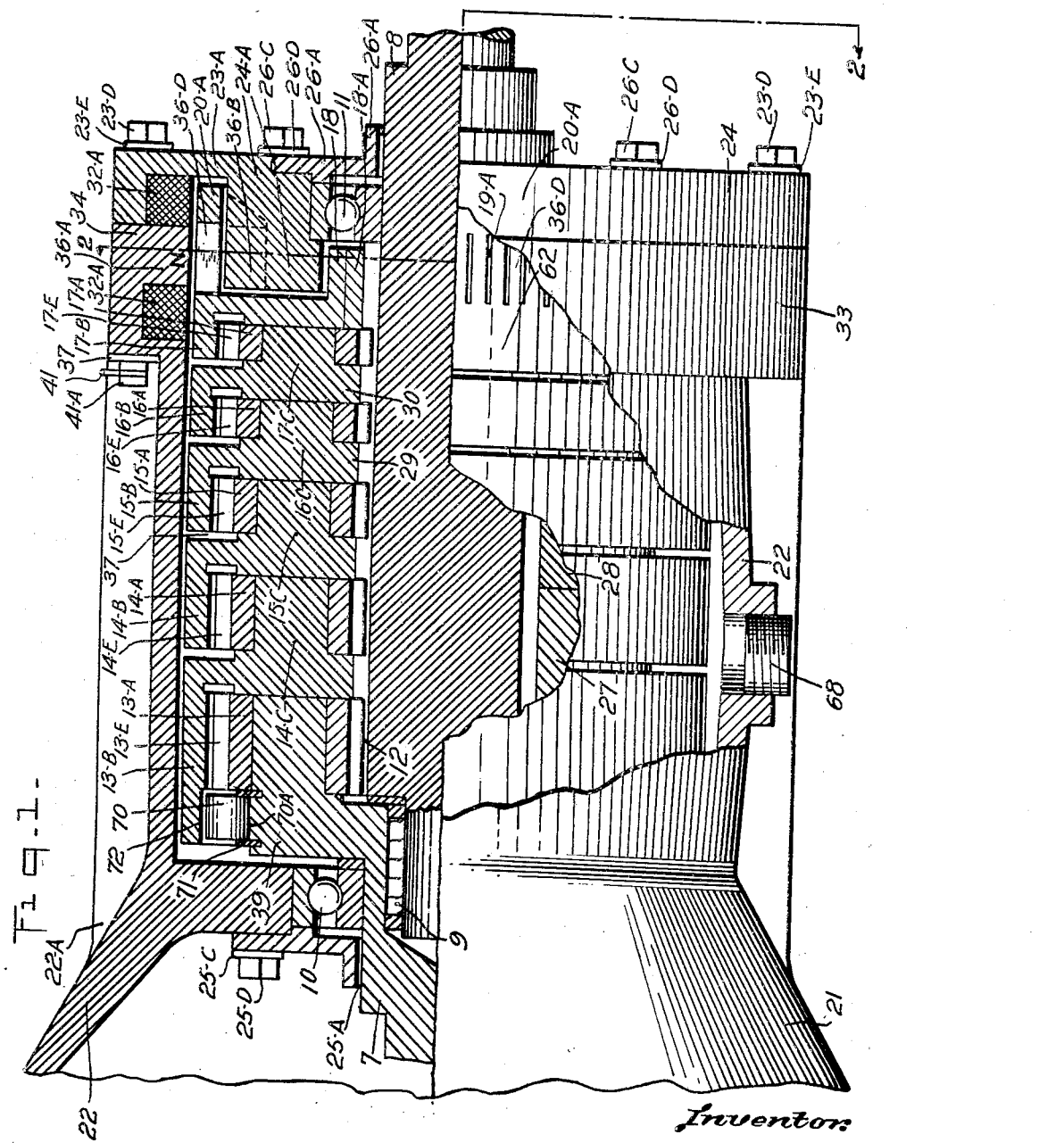

In the following description and in the claims, parts will be identified by specific names for convenience of expression, but they are intended to be as generic in their application to similar parts as the art will permit.

There is shown by Figure 1 of the drawings a novel dynamo-electric machine and associated power transmission elements including a unidirectional clutch constituting collectively an automatic variable speed transmission mechanism with automatic unidirectional positive drive and including a pair of power shafts 7 and 8 disposed in axial alignment with their adjacent ends interfitted so as to provide proper space for the bearing 9.

The power shafts 7 and 8 are mounted for independent rotary movement respectively in suitable bearings 10 and 11 positioned and supported in the transmission casings 22 and 24. While either of these power shafts 7 and 8 may be considered as the driving or driven member of the transmission, for the purpose of this description, it will be considered that the shaft 7 is the normal driving member, and is operatively connected to be driven from a source of power such as an internal combustion engine or other suitable mover (not shown).

Accordingly, shaft 8 is regarded as the normal driven member, and is operatively connected to whatever mechanism (not shown) it is desired to drive from this mover 8.

The shaft 8 is preferably made of a good quality of steel and formed with a plurality of splines or teeth 12 to operatively receive a plurality of groups of toothed planet gears 13—A, 14—A, 15—A, 16—A and 17—A forming together with the annular gears 13—B, 14—B, 15—B, 16—B and 17—B and the teeth 12 a plurality of differential gear sets all connected in speed driving relation with the driven member 8 and the driving member 7 as hereinafter described.

The planet gears 14—A, 15—A, 16—A and 17—A are each supported and positioned by the bearing portions 27, 28, 29 and 30 of the annular gears 13—B, 14—B, 15—B and 16—B so as to be constantly in mesh with the sun teeth 12, and to rotate therewith. Unless otherwise specified the gears of all types shown in Fig. 1 are preferably made of suitable steel, and the casings 22 and 24 are preferably made of suitable magnetic material. The bearing portions of the annular gears 13—B, 14—B, 15—B and 16—B include the shaft portions 14—C, 15—C, 16—C and 17—C to position and support the planet gears 14—A, 15—A, 16—A and 17—A.

With this arrangement it is evident that each planet gear is constantly in mesh with portions of the teeth 12 and one of the annular gears.

In passing it should be noted that the teeth 12 forming portions of the normally driven shaft 8 are in reality sun gears to be considered as an integral member for the purpose of this description, and that each sun portion is a part of a differential gear set. It is evident that a plurality of separate sun gears could be assembled on the shaft 8.

In this event it is obvious that power may be transmitted by and between the power members 7 and 8 by a plurality of power transmission paths, and that each of these paths will act as a means to transmit power in some proportion to the retardation of the rotation of the said differential sets. It is also evident that any retardation of the rotation of the annular gear 17—B will be transmitted to the other annular gears.

A first path is common to a second path for a portion of its length. In the same manner the second path is common to a third path for a portion of its length and so on. All the paths are associated, and any change in the status of one path will be transmitted to the other paths.

A rotor 20—A is formed from a flanged extension of the annular gear 17—B. This rotor is provided with inductor portions 36—D formed by cutting away portions 19—A of the rotor, and the annular gear 17—B is shown mounted on the bronze bearing 18—A at its flanged portion 18. The speed of the rotor and therefore the speed of the annular gear 17—B is always a function of the speed relations of the gears of the differential sets. Any change in the speed of the rotor will cause a change in the speed relations of the power members 7 and 8. If the rotor 20—A is retarded by electrical or magnetic means it is obvious that the differential relations of the differential gear sets will be changed.

In assembly I mount the differential gear sets on the shaft 8. The shaft 7 is provided with clutch rollers 70 positioned about the periphery of the hub extension 39 of the driving member and retained by the locking ring 71. The shaft 8 may then be moved into the casing 22 until the shafts 7 and 8 are in axial alignment with their adjacent ends interfitting with the bearing 9.

The casing 22 is formed to include pole extensions 36—A formed to receive the field producing windings 31—A and 32—A as shown by Figure 2 after which the said windings are locked in position by the insulated keys 32—C. With the shaft 8 in position, the rotor 20—A will be positioned opposite the magnetic pole pieces 36—A. The end portion 24 of the casing may then be attached to the casing 22 by means of the bolts 23—D. The end portion 24 has a portion 23—A ending in a hub extension 24—A formed with a recess to receive the bearing 11 and to provide a magnetic path 24—B including pole pieces 35—A.

With the left hand bearing 10 in position, the end retaining member 25—A may be secured to the casing 22 by means of the bolts 25—D and washers 25—C. The right hand bearing 11 may then be securely positioned between the portion 24—A and the shaft 8 by securing the right hand retainer 26—A to the casing portion 24—A by means of the washers 26—D and the bolts 26—C.

The casing 22 is attached to the vehicle by means of bolts (not shown) securing the bell housing portion 21 of the casing 22 to the same. The field producing windings 31—A and 32—A are attached to a source of power by the leads 41 and 42 as shown by Figure 5.

The means of Figure 1 include a stationary field producing means as windings 31—A and 32—A shown in Figure 2. In Figure 4 there is shown a rotatable field producing means. The only difference between the means of Figure 1 and Figure 4 is the method of supporting the field producing means. The differential sets including the rotor 20 are identical. In Figure 4 there is shown magnetic pole pieces 36—B attached to a ring shaped member 23—B formed to include the portions 24—C, 24—B and 35—B. The portion 24—C is mounted on the shaft 8 and secured to the said shaft for rotation therewith when the bolt 93 is in an operative position. The portion 24—B constitutes a rotatable magnetic path, and the portions 35—B constitute rotatable pole-pieces. The field windings are connected to a suitable ground return and to the source of power by means of the slip-ring 80, lead 79, brush 82 and binding post 84 and 85. The casing 22—C surrounds the field producing elements with proper spacing as indicated by the numeral 88.

An end member 23—C is formed to receive and support the brush 82 and associated elements and is attached to the casing 22—C by means of the bolts 23—D. The vertical section shown by Figure 2 applies to the means of both Figures 1 and 4 except the elements forming the magnetic flux path of Figure 1 are stationary, and the members forming the flux path of Figure 4 are rotatable.

Means for placing the roller clutches 70 of Figure 1 under selective manual control are shown in Figs. 3, 10, 11 and 12. There is shown a crank 78 provided with a hub 77 attached to a manually actuated member 76 by means of the set screw 77—A. This crank 78 moves in a slot 75—A formed in an arm 75 moving axially in the opening 75—C formed in the casing 22—C and ends in a shift-finger 74. A shift-finger collar 73 formed with a cammed extension 73—A is mounted for axial movement on the flanged extension 39—B of the driving member 7 and arranged to receive the shift finger 74 so as to impart a rocking motion to the locking ring 71—A and thereby a similar movement to the restraining barrier 71—B attached to the said locking ring. It is evident that the manually selective means for controlling the clutch rollers 70 of Figure 3 may be employed with the stationary field producing means of Figure 1 or the rotatable field producing means of Figure 4.

In operation let it be assumed that the source of motive power is connected to the normally driving member 7 by means of the conventional foot clutch as commonly found on automotive vehicles, altho it is possible according to the present disclosure to operate a vehicle equipped with the present device without any foot clutch between the source of motive power and the transmission.

Let it be further assumed for the purpose of this description that the source of motive power connected to the normal driving member 7 will rotate the same clock-wise when viewed from the left hand end of Figure 1. The device to be driven such as an automotive vehicle is assumed to be connected to the driven shaft 8, and the field producing windings 31—A and 32—A de-energized.

In this event the planet gears 13—A, 14—A, 15—A, 16—A and 17—A will rotate about their shafts 13—C, 14—C, 15—C, 16—C and 17—C as they revolve about the stationary shaft 8 due to their driving relation with the teeth 12, and the annular gears 13—B, 14—B, 15—B, 16—B and 17—B will move clock-wise or in the same direction as the rotation of the normal driving member 7.

It should be noted that there are more teeth on the annular gears than teeth 12 on the shaft 8, and that each annular gear will be rotated clockwise about the axis of the shaft 8 at a faster rate of speed than the planet gears are moved about the shaft 8. This increase of speed of each annular gear over the speed of its associated planet gear may be designated as the axially advancing speed, and the actual increase of the last axially positioned annular gear 17—B over the speed of the driving member 7 will be determined by the design of the secondary differential sets. It is evident that a wide range of advancing rates are possible, and that this advancing rate may be different for each set.

The differential action of the planet gears, annular gears and the sun teeth of the member 8 may be more clearly seen by reference to Figure 2 of the drawings of my prior application No. 23,040 and hereinbefore noted. Inspection will show that a small increase in the speed advancing ration of annular gear 13—B by the planet gear 13—A will result in a comparatively great increase in the final speed of the last axially positioned annular gear 17—B.

As hereinbefore stated the present disclosure is a development of the invention disclosed in my prior application Serial No. 23,040 filed May 23, 1935. The arrangement of the planet gears, annular gears and sun teeth are alike in both applications. Likewise the speed driving relations and the methods of obtaining underspeed, direct drive, free-wheeling and overspeed drive relations with stationary field producing windings when the normally driving member 7 is driving is completely disclosed in this prior application and shown in its drawings. It is obvious that no additional teaching will be obtained by duplicating such teaching in this disclosure.

As the present disclosure relates to the providing of a unidirectional clutch to the previous disclosure and to the means for substituting a rotatable field producing means for the stationary field producing means of application No. 23,040, this disclosure will be limited more or less to such development.

Therefore let it be assumed that the field windings have been energized and that overspeed driving relations between the driving member 7 and the driven member 8 have been obtained. Let it be further assumed that the speed of the normally driven member 8 is increased by the vehicle until the speeds of members 7 and 8 are the same. Thus there is no "slip" between the rotor and the field windings and a free-wheeling status exists.

If the motion of the vehicle now increases the speed of the normal driven member 8, it will become the driving member and automatic variable free-wheeling in effect will be obtained by the rotor action at first and thence variable speed bidirectional drive as disclosed in the prior application.

The present disclosure provides means for automatically obtaining a positive drive relation between the power members whenever the normally driven member becomes the driving member, and in addition to automatically hold the device to a direct drive relation (with stationary field elements) as the normally driving member tends to drive the normally driven member to an overspeed relation.

Inspection of the clutch rollers 70 of Figure 1 will show that they are preferably positioned between co-operating clutching surfaces of the annular gear 13—B and the driving member 7. These clutch rollers 70 are provided so as to be moved into positive drive relations by these surfaces as a function of the relative movements of the members 13—B and 7. Thus as the clutching surface 72 on the inner periphery of the flanged extension of the gear 13—B is rotated counter-clockwise as the normally driven member tends to exceed the speed of the normally driving member 7, the rollers 70 will be automatically moved into clutching relation to limit the retardation of the rotor to the direct speed "slip" as the normally driving member 7 continues to drive the driven member 8.

It is obvious that the unidirectional clutch surfaces on the member 7 may be so formed as to cause the rollers 70 to be moved into operative clutching relation with relative movement of the members 13—B and 7 in either direction. According to the present disclosure the rollers may be employed to move into positive clutching position whenever the driven member is caused to tend to rotate faster than the driving member. It should be noted that the operator of the vehicle has no direct control over the rollers 70 except through the co-incidental operation of the vehicle.

If the operator of the vehicle does desire to obtain selective slip-drive or positive drive relations between the members, the means shown in the modification as indicated by Figures 3, 10 and 11 may be substituted. In Figure 3 there is shown a control shaft 76 suitably positioned for limited rotary motion in the bell portion of the casing 21—B and operatively attached to a control means 76—A by lever 76—B connected to the conventional foot brake pedal 52 or to a manual control means on the dash (not shown). A crank 78 is attached to the control shaft 76 by means of set screws 77—A for rotation therewith to reciprocate the round shiftable roller control arm 75 in the circular opening 75—C in the casing 22—C.

With the shift-finger 74 in place in the shift-finger slot of a shift-finger collar 73 this rockable movement of the control rod 76 will be selectively imparted to the said collar as the crank portion 78 is moved axially in the guide portion 75—A. A cammed extension formed as a portion 73—A of the collar 73 is thus moved axially relative to a cammed surface of the opening 71—C formed in a rockable locking ring 71—A to selectively rock the same. Thus a roller barrier 71—B attached to the rockable ring 71—A riding in the slot 71—D formed in the member 7 for movement therewith is thus moved relative to the rollers 70 to selectively release them from a normally restrained inoperative position. With the clutch roller control elements 73, 73—A, 71—A, 71—B and the rollers 70 arranged to rotate normally together with the driving member 7, it is evident that the camming action resulting from a relative axial movement between the surfaces of the elements 73—A and 71—A will react to effect a relative rotary movement of the locking ring 71—A to move the barriers 71—B relative to the rollers 70 to release or to restrain the same.

When the device is provided with the means shown in Fig. 3 the operator of the vehicle may selectively restrain the rollers 70 to remain in an inoperative position to thereby obtain variable speed bidirectional drive relations with either stationary or rotatable field producing means.

With the barriers 71—B selectively released by the selective operation of the control rod 76, the operator of the vehicle may obtain positive drive relations whenever the normal driven member tends to become the driving member. When a stationary field producing means is employed as the rollers 70 are released by the barriers 71—B, it is obvious that the rollers will move into clutching position when the normal driving member 7 tends to rotate the driven member 8 into an overspeed driving relation. Thus the retardation of the rotor 20—A or 20—B will be positively held to a direct "slip" speed as the normal driving member 7 continues to drive the normal driven member 8 at a direct drive speed relation.

When the rollers 70 are selectively released with a rotatable field means as the driving member 7 is driving the "slip" speed of the rotor cannot be held to a definite speed as direct drive speed relations will not be reached.

If the conventional foot brake pedal 52 is employed as a co-incidental barrier 71—B control, it is obvious that the rollers 70 will be released every time the pedal is operated. With a settable hand control the barriers 71—B could be moved to a fixed releasable position, or one form of barrier control could be substituted for the other as desired.

In Figure 5 there is shown a source of power 40, a circuit closer 89, leads 41 and 42, field windings 31—A and 32—A, and three field control means. These controls are arranged to be placed individually or collectively in circuit with the said field windings. The manual control includes the switch 46, resistance 50—A and wiper 50. The gas throttle (fuel supply) co-incidental control includes the pedal 57, wiper 45, wiper support 45—A (see Figure 9), resistance 51, settable resistance 51—A, and settable wiper 51—B. The brake co-incidental control means includes brake pedal 52, brake shaft 55, brake resistance 59, wiper 44, wiper support insulation 54, settable resistance 50—C and settable resistance wiper 50—B.

If the conventional ignition switch 89 is employed as the common switch 89 the control circuit organization diagrammatically indicated by Figure 5 will be energized by means of the leads 41 and 42 as a co-incidental function of turning on the ignition system connected to the source of power 40 by means of the leads 91 and 90 (with switch 92 closed). In operation, the wiper 51—B of Figure 9 is set to obtain a proper position on the resistance 51—A assumed to be correct for the conditions under which the vehicle to be operated is to be used. When the gas pedal is operated the wiper 45 is moved across the resistance to additionally vary the total resistance of the fuel supply control. Thus in normal driving of the vehicle only the resistance 51 would be varied, and the resistance 51—B could be changed from time to time as desired.

In the same manner the wiper 44 is moved by the brake pedal 52 to vary the resistance 50, and the resistance 50—C is set as desired. The variation of these resistances 50, 50—C and 51 vary in turn the current passed through the field windings and thereby the strength of the produced field flux as explained in my prior application Serial No. 23,040.

Thus the present disclosure provides means for automatically obtaining variable speed drive relations between driving and driven members of a vehicle, and semi-automatically obtains these said relations as a co-incidental function of the normal operation of the vehicle without any additional mental or physical effort on the part of the operator. In addition, the present disclosure provides means for varying the automatic and semi-automatic action to meet certain operating conditions of the vehicle. The present disclosure also provides means for automatically effecting positive unidirectional drive relations between the driving and driven members.

The roller clutches 70 as shown in Figures 1 and 3 are positioned between an annular element and the driving member. It is obvious that they could be positioned between any of the annular gear elements and the driving member 7, or between any of the said annular elements and the driven member 8. The only requirement being that the rollers 70 will be operated as the normal driven member becomes the driving member. When the rollers 70 are employed as a safety device during periods when the source of motive power is inactive, the barriers 71—B will be set to release the rollers. Thus, if a parked vehicle started to roll down grade or is moved forward the rollers will automatically connect the engine to the vehicle to employ engine compression.

When the device is provided with the rotatable field as shown by Figure 4 of the present drawings the selectively controlled unidirectional clutch means of Figure 3 and the field controls as shown by Figures 5, 8 and 9 may be employed as described for the fixed field producing means of Figure 1. However, if the rotatable field producing means is arranged to rotate with the normally driven member 8, the "slip" relations of the rotor 20—B of Figure 4 and the rotatable field producing elements 32—B, and associated elements will not be the same as with the stationary field producing elements of Figure 1.

A comparison of rotor-field "slip" with use of both stationary and rotatable field elements is diagrammatically shown by the curves of Figure 6. It is understood that all manner of speed drive relations can occur during the normal operation of an automotive vehicle, but it is believed that a simple showing of the rotor "slip" relations during a normal acceleration of the elements of the device to a forward driving and coasting condition of the vehicle will be sufficient for the purpose of the present disclosure.

In Figure 6, group of curves A represent the resulting speed relations of the driving member, driven member and associated rotor with a stationary field means. Group of curves B represent the relative speeds of these members with a rotatable field means attached to the driven member 8 when driving or driven.

Group A

Let it be assumed that the normal driving member 7 is accelerated from a state of rest at point of zero speed $a$ to a speed represented on the line $c$—$c$ at the point $m2$ of intersection by the curve 7. At the same time the associated rotor 20—A will be accelerated to a speed $m1$ on the line $c$—$c$ in the clock-wise direction as the driving member 7. Let it be assumed that the field members including the windings 31—A and 32—A are energized at the time $c$—$c$ by any of the selective co-incidental control means shown in Figures 5, 8 and 9. Thus the driven member 8 will start to rotate at the point $m3$ as the rotor 20—A is differentially retarded by the produced field, and the acceleration of the driven member will be indicated by the curve 8D. At the point $n1$ on the line of time $d$—$d$ the driving member 7, driven member 8 and the rotor 20—A are moving at the same speed, and a condition of direct drive has been effected by the device.

Continued retardation of the rotor 20—A causes the driven member 8 to tend to rotate faster than the driving member and the annular gear as 13—B of Figure 3 will in effect reverse relative to the driving member 7. If the barriers 71—B have been selectively moved from a roller restraining position, the rollers 70 will be moved into a clutching position and no further retardation of the rotor 20—A "slip" can occur. Thus the rollers 70 will automatically act to prevent the members 7 and 8 from reaching an overspeed driving relation, and the members 7 and 8 will be held to a direct drive speed relation beginning at the point $n1$ and continues along the line $n1$—$s$—$1$.

If the barriers 71—B are not released at the point $n1$ the rollers 70 will remain restrained. Continued retardation of the rotor 20—A after the time $d$—$d$ now causes the driven member 8 to be rotated at a faster speed than the driving member, and maximum over-speed is effected at the point $p1$ on the line $e$—$e$. For a given set of operating conditions this relation will continue between the lines of time $e$—$e$ and $f$—$f$ as the vehicle continues to be driven forward by the driving member 7.

It should be noted that the rotor 20—A is decelerated to a speed $p2$ or less than the speed of the normally driving member 7, and that a constant field-rotor "slip" is established for the given set of conditions. Now let it be assumed that the vehicle has reached the start of a coasting period. The load resistance on the normally driven member 8 will start to decrease as at the point $r1$ of the time line $f$—$f$. With the driving member 7 continuing at constant speed the driven member 8 due to its decreasing resistance will accelerate as will the associated rotor 20—A.

As the load resistance decreases the driven member 8 will accelerate with the rotor 20—A until the driving member 7, driven member 8 and the rotor 20—A are all rotating at the same speed as indicated at the point $s1$. This is a condition of free-wheeling. If the vehicle now continues to accelerate the normally driven member 8 to cause it to become the driving member to drive the normally driving member 7, such condition will act to cause the rotor 20—A to now tend to rotate counterclockwise and thus the annular gear 13—B will also tend to rotate counterclockwise. In this event the clutch rollers 70 of Figures 1 and 3 will be moved automatically into positive clutching relation with the annular gear 13—B and the driving member 7. Thus the members 7 and 8 will be placed in positive direct drive relation with the member 8 driving. If the barriers 71—B have not been released variable speed drive relations will exist between the members as hereinbefore described. If the vehicle continues to accelerate, the line 70 will of course bend upward.

If the member 8 is now employed as the normal driving member, and is attached to the source of vehicle motive power (not shown), it will be accelerated from the zero speed $a$ along the curve 8 to the point $m2$ of line $c$—$c$. The rotor 20—A will be accelerated at the same time counterclockwise along the line 20—A—8 to the speed of point $m4$ of the line $c$—$c$. If the field windings 31—A and 32—A of Figure 1 are now energized the driven member 7 will now be accelerated clockwise as the rotor is decelerated in its counterclockwise rotation by the produced field until a balanced torque driving condition is reached at the points $p5$ $p3$ $p4$. The rotor 20—A will decelerate to a speed $p4$, the driven member 7 will attain a clock-wise speed of $p3$ as the driving member 8 continues to rotate at the speed shown as $p5$.

This relation will continue between the instance indicated by the lines $e$—$e$ and $f$—$f$ with the "slip" $i$ between the stationary field elements and the rotor 20—A. If the vehicle starts to coast the speed of the driving member 8 will remain constant, the speed of the driven member will increase to approach the speed of the driving member 8, and the rotor will be decelerated to zero speed and rotated in a clock-wise direction to approach the free-wheeling speed of the member 8 at the point $s1$. If the speed of member 7 now is accelerated beyond the speed of the driving member 8, the annular gear 13—B will reverse its speed relative to the member 7 and the unidirectional clutch rollers 70 of Figure 1 will be automatically moved into positive clutching relation with the gear 13—B and the member 7 and the members 8 and 7 would be placed in positive direct drive relation. It will be noted that rotor retardation cannot effect direct drive speed relations when the member 8 is the driving member because there would be no "slip" relations at all between the rotor 20—A and the stationary field elements. It should be noted that over-speed relations cannot be effected by the retardation of the rotor 20—A with the member 8 as the driving member. Thus during certain coasting conditions the operation of the clutch rollers will be very desirable to more effectively employ engine compression for braking purposes, and also as a safety device.

Group B of the curves of Figure 6 indicate the balanced bidirectional drive relations between the members 7 and 8 when a rotatable field producing means is employed. These curves are based on the assumption that the field producing elements are attached to the member 8 for rotation therewith, as shown by Fig. 4 of the present drawings. With the member 7 employed as the normal driving member and accelerated to the speed of $m6$ on line $c$—$c$ the rotor 20—B of Figure 4 will be accelerated clock-wise to the speed $m5$ as indicated on line $c$—$c$.

The field producing means will remain stationary as the driven member 8 has not been rotated. Now let the field windings 31—B and 32—B of Figure 4 be energized and the rotor 20—B will be retarded to the speed $p5$ on line $e$—$e$ as the speed of the driven member 8 and thus the speed of the attached field means will be accelerated to the speed $p7$ on the line $e$—$e$. In this event the "slip" of the rotor 20—B will be decreased by both the acceleration of the field means and the deceleration of the rotor. Thus retarding the rotor cannot bring about direct drive relations between the members 7 and 8 with the member 7 driving under these conditions. With a given operating condition the "slip" $j$ will be maintained to the period of line $f$—$f$. If down grade is encountered the load will be removed from the driven member 8 and it will approach the speed of the driving member 7 at the speed $s2$. The rotor 20—B will be decelerated to approach the speed of the member and a condition of free-wheeling will occur at the point $s2$.

If the vehicle continues to accelerate the driven member 8 so as to cause it to become the driving member, the rotor will start to rotate counterclockwise, and the annular gear 13—B will also start to rotate counterclockwise relative to the driving member 7. In this event the clutch rollers will be moved into positive clutching relation between the gear 13—B and the member 7, and the members 7 and 8 will be placed in positive direct drive relation as shown by the double line $s2$—$s4$ which will be curved upward if the vehicle continues to accelerate the driven member 8.

Now let it be assumed that the normally driven member 8 of the means of Figure 4 is employed as the normal driving member. Referring to group B of the curves of Figure 6, it will be seen the driving member 8 starts to accelerate at the point $b$ and is at constant speed at the point $m6$ on the line $c$—$c$. The rotor 20—B of Figure 4 has been accelerated counterclockwise to a speed represented by the point $m8$ on the line $c$—$c$. Thus a "slip" rotor speed equal to the sum of the speeds of the rotor 20—B and the driving member 8 exists. The field windings 31—B and 32—B are energized and the driven member 7 accelerates to the speed of point $p7$ on line $e$—$e$ as the rotor decelerates to zero speed and then rotates in a clockwise direction. A normal constant forward driving movement is imparted to the vehicle during the interval between lines $e$—$e$ and $f$—$f$ at which time a coasting condition is encountered. The load will be decreased on the driven member 7 to cause it to increase to approach the speed of the driving member 8 at the point $s2$. The rotor 20—B will also be accelerated to the speed $s2$ at which time the driving member 8, the driven member 7 and the rotor will all be rotating at the same speed and thus free-wheeling will be effected. If the vehicle continues to accelerate the driving member 7 the annular gear 13—B will reverse its movement relative to the member 7 and the clutch rollers 70 of Figure 1 will automatically move into clutching relation between the members 13—B and 7 and the members 7 and 8 will be in positive drive relation.

Thus it will be seen that the application of the rotating field as shown by the means of Figure 4 results in a device providing a more or less balanced bidirectional operation. According to the curves of group B of Figure 6 the means of Figure 1 so far as the differential sets is concerned may be designed to effect about the same driving speed relations with either member 7 or member 8 driving.

It should also be noted from the curves of group A of Fig. 6 that an unbalanced bidirectional speed driving relation is inherent in the device when the stationary field elements of Fig. 1 are employed.

According to group A, a stationary field effects universal speed driving relations between the members with member 7 driving, but direct drive can only be approximately approached between the members when member 8 is the driven member.

The proper use of the stationary field elements or the rotatable field elements of course will be determined by the conditions under which the device will be installed and used.

In actual operation of the device it was found that the roller clutches 70 were employed to a greater extent with the stationary field elements than with the rotatable field elements.

The present disclosure contemplates the use of any method known or used in the art for producing a magnetic field and for passing an inductor through the said field; the only requirement being that currents are induced in the paths 58 and 59 of Figure 7 when the inductors 36—D and the produced field are moved relative to each other. If natural magnets are employed with short-circuited rotors as 20—A of Figure 1 and 20—B of Figure 4 no external control will be included as the couple are assumed as designed for the normal operation of the vehicle. With commutator armatures, the induced current may be conducted to an external circuit, and a control system would include the co-incidental elements of Figures 8 and 9.

The disclosure also contemplates that the field producing elements and the associated inductors may be arranged in any suitable combination with the power members and annular gears and with stationary means without departing from the spirit of the invention so long as relative motion between the field and the inductors is provided.

It is considered not necessary to include showings of all the known methods of arranging associated fields and inductors, as these showings are already available to those skilled in the art.

It is also within the scope of this invention to employ any known means of providing suitable bearing surfaces for positioning and supporting the different elements of this transmission device, and for lubricating, adjusting and cooling the same.

While I have shown and described and have pointed out in the annexed claims certain new and novel features of my invention, it will be understood that certain well known electrical and mechanical equivalents of the elements illustrated may be used, and that various other substitutions, omissions and changes in the form and details of the devices illustrated and in their operation may be made by those skilled in the art without departing from the spirit of the invention.

Having thus described my invention, I claim:

1. A device for causing a pair of power members forming a portion of a vehicle provided with brake and fuel control mechanisms to approach a driving speed relation, said device including means constituting differential driving sets each in driving relation with one of the members and with adjacent sets, one set in selective driving relation with the other member, a rotatable dynamo-electric field-armature couple including two elements, one element connected to one of the sets and the other element connected to one of the members, a cam actuated clutch roller means positioned between said members for normal operation as a unidirectional clutch, and a control for said couple, said control varied by the said fuel control mechanism whereby the action of the couple will be synchronously varied with the fuel supply.

2. A device for operatively associating a driving member and a driven member forming portions of a vehicle equipped with brake control and fuel control mechanisms, comprising differential driving sets each connected to the normal driven member and to each other, one of the said sets connected to the driving member, a dynamo-electric couple including a stationary field producing element and an armature element connected to another of the said sets, and a manually operated selectively controlled unidirectional clutch roller means between said members and including elements for operatively connecting same to the brake control mechanism whereby power may be selectively transmitted from the normally driven member to the normally driving member as a function of the operation of the brake control mechanism.

3. A device for operatively associating driving and driven members of an automotive vehicle equipped with fuel and brake control mechanisms in torque controlled variable speed drive relation, including axially positioned differential drive sets connected to each other, one of the sets connected to the driving member and another of the said sets connected to the driven member, a resistant slip-clutch member connected to one set and therethrough to all the sets, and a manually controlled unidirectional clutch roller means between the driving member and the resistant member arranged to selectively permit the resistant member to co-operate with the driving member to drive the driven member at a speed proportional to the resistance of the resistant member and means for coincidently controlling said roller clutch with the operation of the said brake control mechanism.

4. A device for operatively associating driving and driven members of an automotive vehicle equipped with brake and fuel control mechanisms, constituting differential sets each connected to one of the members and to adjacent sets, one of the said sets connected to the other member, a variable speed drive control couple including a fixed field producing element and an armature element connected to one of the sets, a plurality of separately positioned control means for controlling the drive control action of the said couple as a function of the operation of the brake and fuel control mechanism, and a unidirectional roller clutch mechanism between one of the sets and one of the members, and manual control means to cause said unidirectional clutch to become an inactive clutch when required.

5. A variable speed-torque device for connecting a driving member with a following member in speed-torque relations according to the resistance of the following member, including differential sets arranged to provide progressively divisible power paths between said members, a variable speed-torque couple including a rotatable armature element connected to one of the members and a field producing element connected to one of the said sets, a plurality of separately adjustable individually and coincidently actuated controls for said couple, certain of said controls adjusted to supply different field strengths than other controls whereby the action of the couple will be different when power is transmitted from the normal driving member to the following member than when power is transmitted from the normal following member to the normal driving member, a unidirectional roller clutch mechanism positioned between said members, and manual control means to cause said unidirectional clutch to become an inactive clutch when required.

6. A dynamo-electric device for connecting driving and driven elements in variable speed driving relations, comprising differential gear sets arranged in differential speed relation and mounted for rotation with said elements about a common axis, a dynamo-electric couple including an armature connected to one of the sets and a field producing means connected to one of the elements, a plurality of separately actuated circuit closers for separately controlling the supply of current to the said field producing means, a roller clutch mechanism between said elements, and a manually actuated clutch control cooperatively associated with one of the closers for selectively causing the said clutch to normally act as an inactive clutch and as a unidirectional clutch when the normally driven member is employed as the driving member.

7. A device for affecting speed-torque drive relations between driving and driven power members of an automotive vehicle provided with braking and power supply control mechanisms, comprising differential drive sets each in driving relation with one member and with adjacent sets, one set in driving relation with the other member, a control couple including a fixed magnetic field producing element and an associated armature element connected to another set to rotate therewith, a plurality of circuit closers and associated resistances, one of said closers positioned to be operated as a function of the operation of the power supply control mechanism and the other closer positioned so as to be operated as a function of the operation of the braking control mechanism thereby to energize the said field according to the adjustment of the said resistances, a unidirectional roller clutch mechanism including clutching surfaces forming a portion of one of the members and one of the sets and manual control means to cause said unidirectional clutch to become inactive when required.

8. The combination of a pair of power members forming a portion of an automotive vehicle provided with brake control mechanism and power control mechanism, a torque controlled driving connection therebetween including differential driving sets each in speed driving relation with one of the members and with each contiguous set, one set in driving relation with the other member, a rotatable control couple including an armature element forming a portion of another set and a second element constituting a field producing means connected to one of the members, means including a plurality of separately variable field current controls, one of said controls including a circuit closer positioned to be operated by the operation of the power control mechanism and another of the said controls positioned to be operated by the operation of the braking mechanism, a source of electric current, means for connecting the said source to the said field producing means through said brake and power supply mechanism operated closer, and additional means for supplying current to the said field independently of and conjointly with either of the closers actuated by the brake and power control mechanisms.

9. A speed-torque control device for completing driving relations between normally driving and normally driven power members of a vehicle equipped with a source of electric power, comprising differential drive sets one of which is connected to the driven member and each set connected to the driving member and to adjacent sets, rotatable driving control means including an armature element forming a portion of one of the sets and an element constituting a field producing means forming a portion of one of the members, means constituting vehicle brake and fuel control mechanism, means constituting three separate field control mechanisms for supplying current from the said source to the said field means, one of said control mechanisms actuated with the fuel supply of the vehicle, a second of the said control mechanisms actuated with the brake control mechanism of the said vehicle, and a third field control mechanism manually actuated independently of the fuel and brake mechanisms whereby the action of the said driving control means will depend on its control by the selective actuation of the three field controls and the brake and fuel control mechanism.

10. A device for automatically and manually effecting variable speed drive relations between driving and driven power members of an automotive vehicle equipped with a source of electric power and brake and power control mechanisms, comprising differential sets each arranged in speed driving relations with one of the members and with each other, one of said sets in speed driving relation with the other member, a drive control couple including a stationary field producing element and an associated armature element constituting a portion of another set, a plurality of field control circuit closers coincidentially actuated by the said brake and power control mechanisms in the normal operation of the said vehicle whereby the speed driving relations of the said members will be effected as a function of the normal operation of the said vehicle, a roller clutch means positioned between said members for normal oepration as an inactive clutch, and manually actuated clutch control means for causing the said roller clutch to selectively become a unidirectional clutch.

11. The combination of a driving member and a driven member forming portions of an automobile provided with a source of electric power and braking and power supply control mechanism, a differential driving connection therebetween including differential sets each in speed driving relation with one of the members and with an adjacent set, one set in driving relation with the other member, means constituting a combined automatic and manually controlled drive effecting couple including a coincidental brake and power supply mechanism controlled field element forming a portion of one of the members and an armature element forming a portion of the said connection, said couple acting according to the combined effect of the driving resistance of one of the members and the braking and power supply controlled intensity of the field for causing the said driving relation to effect said driving connection, and a manually actuated circuit closer for varying the intensity of the said field independently of the braking or power supply control mechanism and also of the said resistance of the said member.

12. The combination of a pair of power members adapted to be automatically and manually disposed and controlled in speed driving relation according to the power transmitted, comprising speed driving sets in driving relations with one of the members and with each other, one set in driving relation with the other member for causing the said members to approach such driving relation when automatically and manually controlled, means providing said automatic and manual control comprising a coincidentally controlled roller clutch and a dynamo-electric means including a field producing means and an associated armature connected to the said sets for causing said approach and in addition to complete and maintain said relation when effected, a fixed control for said field, and a variable supplementing manually actuated field control including current varying elements concurrently actuated with the said roller clutch control for varying the automatic control as a function of the normal operation of the members.

13. The combination of vehicle driving and driven members, means including differential driving sets each in driving relation with one of the members and with adjacent sets, one set in driving relation with the other member, a driving control couple, said couple connected to said members to receive therefrom the power to actuate said means concurrently, control means actuated as a function of the normal operation of the vehicle for initiating, disconnecting and maintaining the reception of driving control power by the said couple and for varying said power reception, a roller clutch mechanism positioned between said members, and means for co-incidently controlling said roller clutch with the operation of the said control means.

14. A load controlled device for effecting and affecting variable speed driving relations between a pair of power members, comprising gear sets collectively constituting a differential member axially positioned between said members, each set connected to one of the power members and to adjacent sets, one set connected to the other power member, a dynamo-electric load control organization including a field producing portion and an associated armature portion operatively connected to said members and said sets, means including a circuit closer for initiating the action of the load control device for effecting a driving relation, a second manually actuated control including a coincidentally actuated roller clutch and a circuit closer for selectively affecting the effected driving relation when power is transmitted in one axial direction, and a third control for said device for affecting an effected drive relation when the power is transmitted in an axially opposite direction.

15. A device for effecting and affecting variable speed drive relations between driving and driven power members of an automotive vehicle equipped with a source of electric current and braking and power supply control mechanisms, comprising differential drive sets each in driving relation with one of the members and with adjacent sets, one set in driving relation with the other member, a drive control couple including an armature forming a portion of one of the sets and an electric field producing member connected to one of the power members, means constituting a plurality of circuit controls for selectively supplying current to the said field producing member, one of said controls including a manually actuated circuit closer, a second field control including a variable resistance and a circuit closer actuated with the power supply control mechanism to coact with the first named field control to bidirectionally effect and affect the said drive relations when the driving member is driving the driven member, and a third control including a variable resistance and a circuit closer concurrently actuated by the braking mechanism to unidirectionally effect and affect a driving relation when the normally driven member is driving the normally driving member, said drive control couple automatically affected by the resistance of the driven member as it is additionally manually affected by the said field controls.

16. The combination of a vehicle driving member and a driven member, electric drive control means including a plurality of axially positioned differential driving sets in speed driving relations with one of the members and the electric control and with each other, one set in driving relation with the other member for automatically affecting the drive control means to react on the sets to cause the said members to assume variable speed driving relations as a function of the speed of one member and the resistance of the other member, and a roller clutch means between the members for normally effecting a positive unidirectional drive, and manually actuated vehicle brake control means for concurrently causing the said clutch to act as a unidirectional clutch when the speed of the normally driving member exceeds the speed of the normally driven member and to normally effect a unidirectional free-wheeling status between the said members when the speed of the normally driven member exceeds the speed of the normally driving member.

17. A device for automatically and manually effecting and affecting variable speed drive relations between a driving member and a driven member of a vehicle provided with braking mechanism and power supply control mechanism, comprising differential gear sets arranged for rotation about a common axis so as to provide elements co-acting with each other and with the members, a dynamo-electric couple including a retardable armature element connected to the sets to automatically effect and affect the said power drive relations when retarded, a fixed field producing means associated with the said armature, circuit control means actuated by the said braking and power mechanism to supply current to the said field means as a function of the normal operation of the vehicle, and a roller clutch between the said driving member and the driven member, said clutch including manually actuated control portions for selectively affecting said clutch to cause same to become a unidirectional clutch as the normally driving member becomes the driven member.

18. A device for co-incidentally effecting and affecting speed drive relations between driving and driven members of a vehicle as a function of the normal operation of the vehicle braking and power supply mechanisms, comprising differential sets each arranged in speed driving relation with the driven member and to each contiguous set, one of said sets in speed driving relation with the driving member, an automatically and concurrently controlled speed effecting and affecting couple operatively associated with said sets and said members, a plurality of remotely and separately positioned control means for varying the speed effecting and affecting action of the said couple, said controls separately selectively actuated with the actuation of the said brake and power control mechanisms as a function of the normal directional power operation of the vehicle, and an additional manually settable control for said couple arranged to permit the said couple to normally and automatically effect and affect the drive relations of the said couple independently of the brake and power mechanism operated couple controls.

19. The combination of a vehicle equipped with a pair of vehicle power members adapted to be disposed in an interdriving relation, said vehicle provided with a source of electric current and braking and power control devices, differential driving sets in driving relation with one of the members and with each other, one set in driving relation with the other member, a dynamo-electric couple including a magnetic field producing portion and an associated armature portion connected to said differential driving sets, a plurality of field current controls, one of said controls including a manually settable element arranged to supply current from the said source to the said field portion to induce sufficient reaction in the said armature to cause the sets to begin to function and thereby cause said members to approach said relation, a second control actuated as a function of the operation of the power control mechanism to supply current to the said field element to cause the said sets to complete and maintain said relation as long as the manual operation of the said power mechanism continues, a third control actuated as a function of the operation of the braking control mechanism and arranged to supply current to the said field portion independently of the power mechanism operated couple control, and a mechanical roller clutch positioned between said members and normally providing an inactive drive between said members, said mechanical clutch including means actuated by the brake control mechanism for causing same to become a unidirectional clutch as the normally driven member becomes the driving member.

20. A combined manually, automatically and co-incidentally controlled variable speed couple for connecting a driving member of a vehicle equipped with fuel and brake control mechanisms to a driven member in variable speed drive relation, comprising axially disposed differential driving sets all connected to the driving member and to each adjacent set, said driven member connected to a first axially positioned set, a dynamo-electric couple including an armature element connected to the last axially positioned set and an associated field producing element connected to the driving member, a plurality of controls for said couple each including a variable resistance and a circuit closer, one of said controls including a manually settable closer for normal automatic operation of the couple as a function of the resistance of the driven member, another of the said controls operable as a function of the operation of the power supply of the said vehicle to cause the operation of the said couple as a function of the variable supply of power to the said vehicle and the resistance of the driven member, still another control including a roller clutch mechanism operable as a function of the operation of the braking mechanism of the said vehicle to cause the couple to act as a function of the resistance of the normally driving member when driven and the degree of the braking action during the application of the said vehicle braking devices.

HOWARD J. MURRAY.